Figure 1:
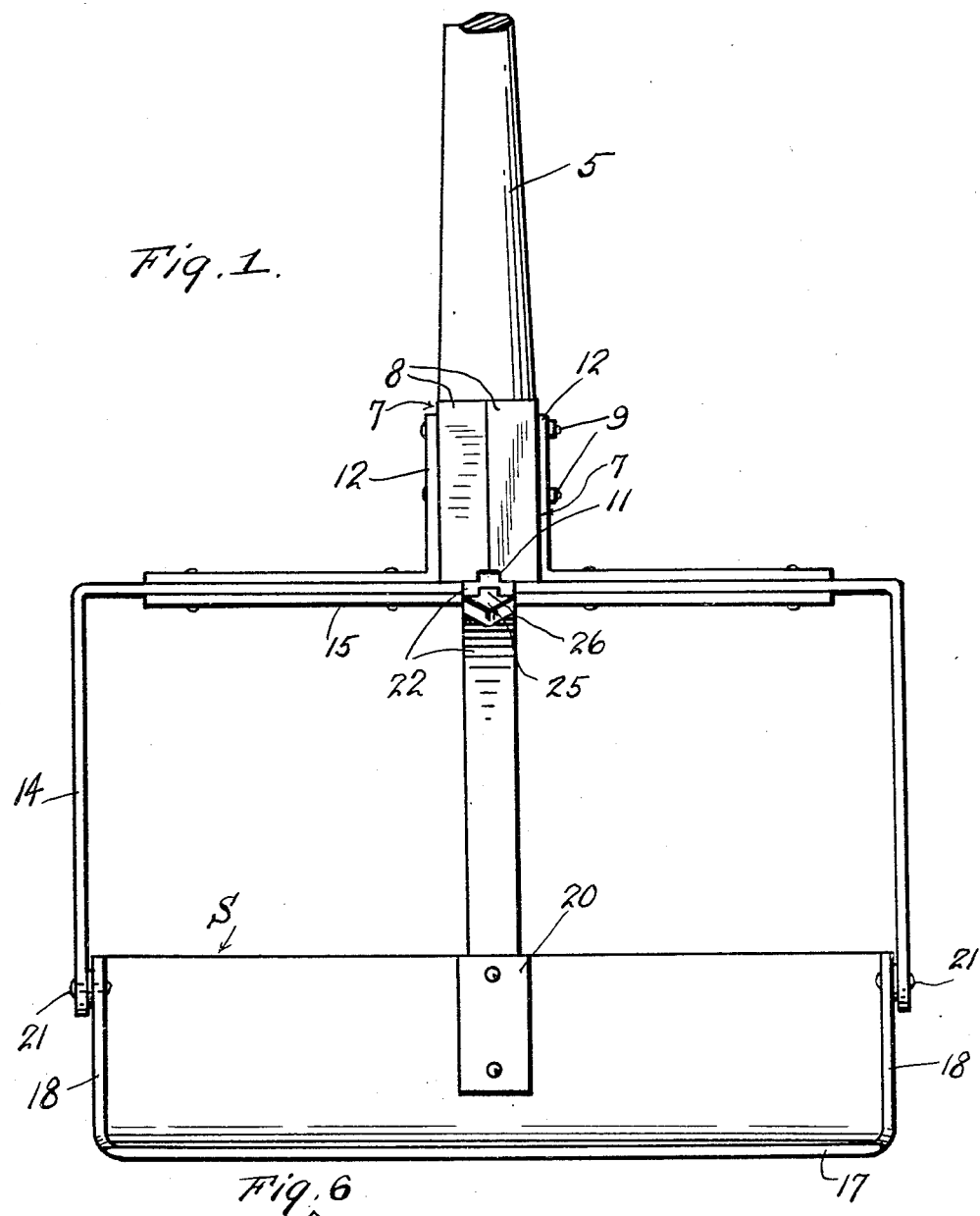

Oct. 27, 1931.   A. DEMARY   1,829,584
SHOVEL
Filed July 15, 1930   3 Sheets-Sheet 1

Inventor
Albert Demary
By Clarence A. O'Brien
Attorney

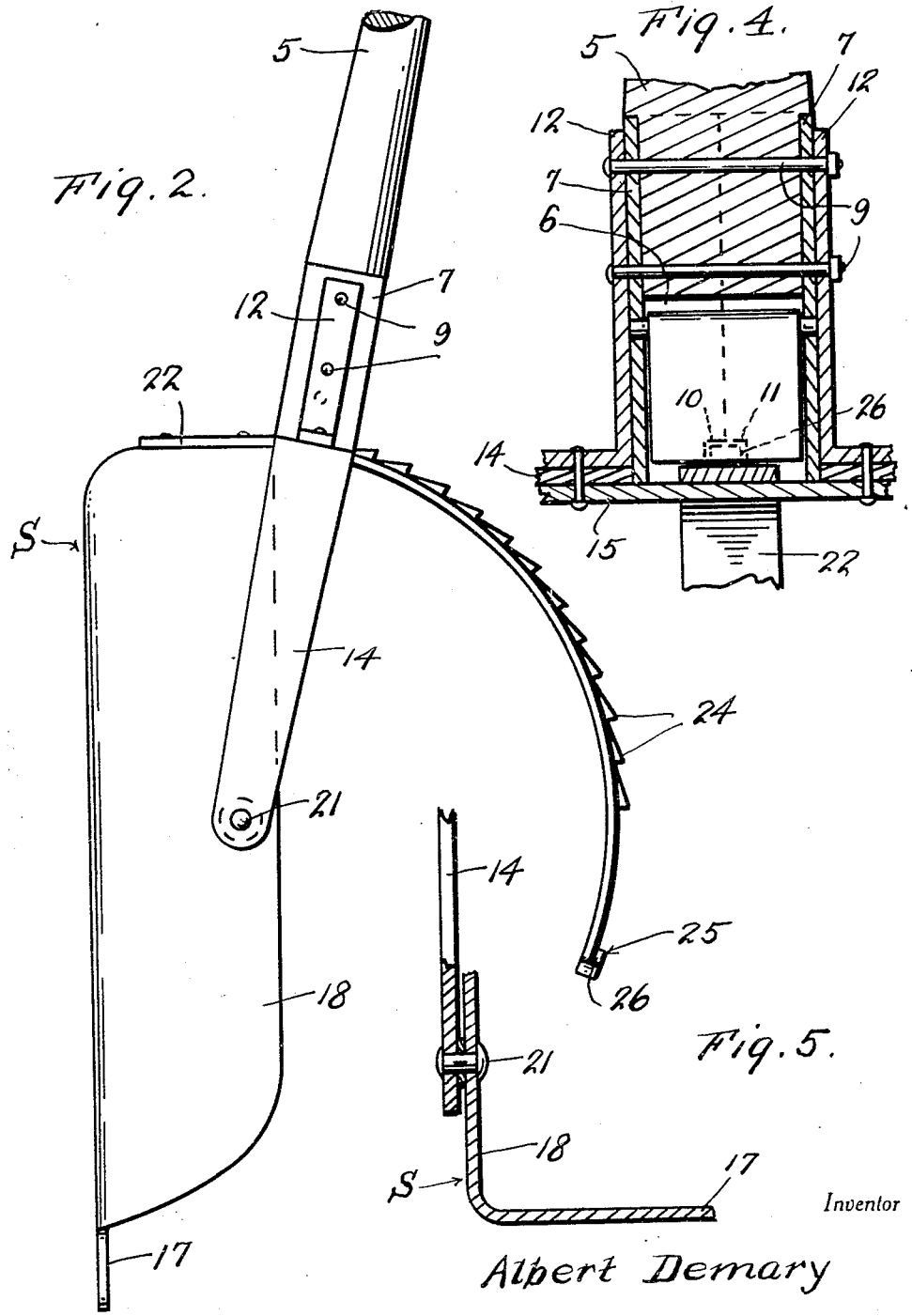

Oct. 27, 1931.  A. DEMARY  1,829,584
SHOVEL
Filed July 15, 1930   3 Sheets-Sheet 3
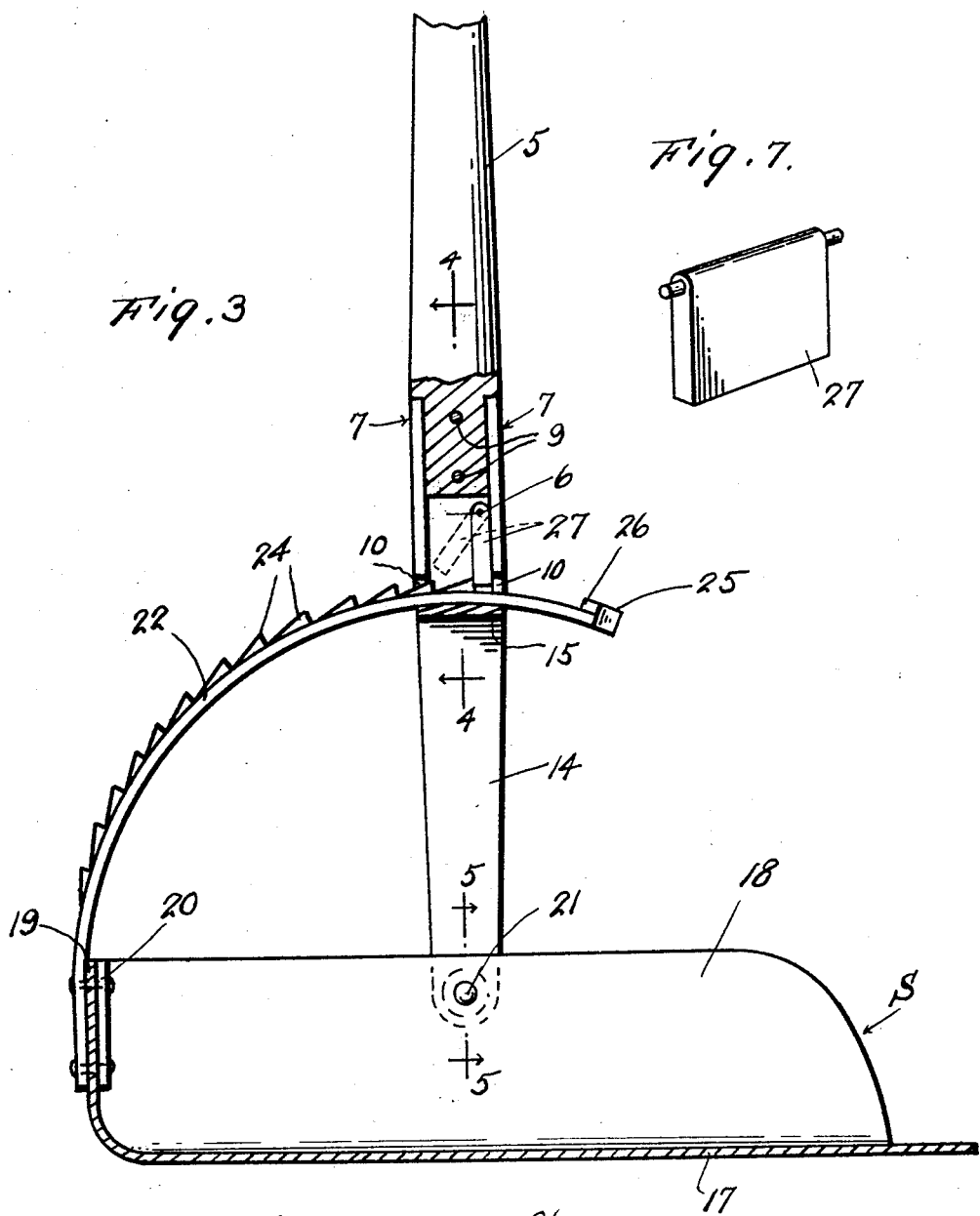

Patented Oct. 27, 1931

1,829,584

UNITED STATES PATENT OFFICE

ALBERT DEMARY, OF ENDICOTT, NEW YORK

SHOVEL

Application filed July 15, 1930. Serial No. 468,181.

The present invention relates to shovels used for shovelling dirt and digging holes in the ground such as telephone, telegraph, sign posts, guide posts and fence post holes and in cleaning manholes and the like.

The object of the invention resides in the provision of a shovel structure of this nature which is simple, easy to manipulate, strong and durable, inexpensive to manufacture, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 6:
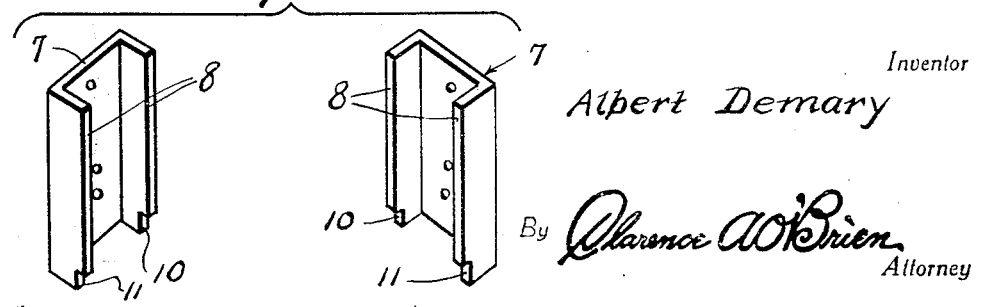

In the drawings:

Figure 1 is a front elevation of the shovel embodying the features of my invention, Figure 2 is a side elevation thereof showing the shovel in a dumped position, Figure 3 is a vertical section therethrough, Figure 4 is a vertical detail section taken substantially on the line 4—4 of Figure 3, Figure 5 is a vertical detail section taken substantially on the line 5—5 of Figure 3, Figure 6 is a perspective view of a pair of plates, Figure 7 is a perspective view of the pawl, and Figure 8 is a detail top plan view of the ratchet bar.

Referring to the drawings in detail it will be seen that the numeral 5 denotes an elongated handle, the bottom end of which is recessed to receive a pair of plates 7 which are provided with mating side flanges 8. The plates and flanges form a socket 6 and the plates are bolted to the handle as shown at 9. The flanges 8 at their bottom ends are formed with notches 10 and 11, the notches forming openings which communicate with the socket when the plates are attached to the handle.

Angular brackets 12 are secured to the plate 7 by said bolts 9. Brackets 14 are riveted or otherwise secured to the brackets 12 and further braced with respect thereto by a cross bar 15. The letter S denotes generally a shovel which includes a bottom 17, sides 18, and back 19 reinforced with a plate 20. The ends of the brackets 14 are pivotally engaged with the sides 18 as at 21. An arcuate bar 22 is riveted to the center of the back 19 and extends through the openings formed by the notches 10 and 11 and through the opening 6 and said bar is provided on its convex side with a plurality of ratchet teeth 24 and on its extremity with a stop head 25 having a projection or lug 26. A pawl 27 is pivotally mounted in the socket 6 for engaging the ratchet teeth 24.

With the parts shown as in Figure 3 it will be seen that the pawl 27 prevents the shovel S from rocking in a clockwise direction. However by rocking the shovel S in a counter clockwise direction so that the lug 26 engages the pawl 27, said pawl may be positioned so that the shovel may be rocked in a clockwise direction to the position shown in Figure 2 which is the starting position of use.

After the dirt in the hole has been loosened by the use of a bar or the like, the shovel is placed in the hole in a vertical position as is shown in Figure 2 and then the handle is pushed forwardly during this movement the pawl ratchets over the teeth. As the handle is moved in an opposite direction, the pawl will engage one of the teeth so that the bar 22 is caused to move with the handle and thus the shovel will be rocked on its pivot. Thus the return movement of the handle causes the pan to scoop up the dirt in the hole. When the shovel has reached a level position it is lifted from the hole by the handle.

It is thought that the construction, operation, utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In an apparatus of the class described, an elongated handle, a shovel rockably engaged with the handle, and a pawl and ratchet mechanism for controlling the rocking movement of the shovel with respect to the handle, said mechanism comprising means for forming a socket at the lower end of the handle with the pawl in said socket, and a rack bar of arcuate construction on the shovel movable through the socket and engageable by the pawl the teeth on said bar terminating an appreciable distance from the free end thereof and a projection on said free end engaging the pawl to move said pawl to its ratcheting position.

2. In an apparatus of the class described, an elongated handle, brackets on the lower end of the handle forming a socket, said brackets having openings therein communicating with said socket, angle brackets attached to the first brackets, brackets attached to the second brackets, and forming a depending yoke-shaped member, a shovel pivoted between the limbs of said member, an arcuate bar on the shovel having ratchet teeth thereto, the bar passing through the socket and the openings in the first mentioned brackets, a pawl in the socket in the handle engageable with the ratchet teeth on the bar and a stop head on the free end of the bar having a lug to move the pawl to a release position.

In testimony whereof I affix my signature.

ALBERT DEMARY.